(12) United States Patent
Molinier et al.

(10) Patent No.: US 7,189,375 B2
(45) Date of Patent: Mar. 13, 2007

(54) EXHAUST TREATMENT DEVICE

(75) Inventors: Michel Molinier, Houston, TX (US); Owen H. Bailey, Concord, OH (US)

(73) Assignee: Delphi Technologies, Inc., Troy, MI (US)

(*) Notice: Subject to any disclaimer, the term of this patent is extended or adjusted under 35 U.S.C. 154(b) by 779 days.

(21) Appl. No.: 10/244,803

(22) Filed: Sep. 16, 2002

(65) Prior Publication Data

US 2004/0052699 A1 Mar. 18, 2004

(51) Int. Cl.
*B01D 50/00* (2006.01)
*B32B 27/02* (2006.01)

(52) U.S. Cl. ............... 422/171; 422/180; 422/177; 60/297; 60/299; 60/311; 55/DIG. 30

(58) Field of Classification Search ............... 422/171, 422/180, 177; 60/297, 299, 311; 55/DIG. 30
See application file for complete search history.

(56) References Cited

U.S. PATENT DOCUMENTS

| 5,614,596 | A | 3/1997 | Laine et al. ............... 525/389 |
|---|---|---|---|
| 5,908,480 | A | 6/1999 | Ban et al. ............... 55/482 |
| 5,961,931 | A | 10/1999 | Ban et al. ............... 422/171 |
| 6,159,430 | A | 12/2000 | Foster et al. |
| 6,235,254 | B1 | 5/2001 | Murphy et al. ............ 423/212 |
| 6,338,827 | B1 | 1/2002 | Nelson |
| 6,354,903 | B1 | 3/2002 | Nelson |
| 6,361,821 | B1 | 3/2002 | Anderson et al. |
| 6,391,822 | B1 | 5/2002 | Dou et al. |
| 6,438,839 | B1 | 8/2002 | Hardesty et al. |
| 6,455,463 | B1 | 9/2002 | Labarge et al. |
| 6,464,945 | B1 | 10/2002 | Hemingway |
| 6,464,947 | B2 | 10/2002 | Balland |
| 6,468,484 | B1 * | 10/2002 | Dou et al. ............... 423/213.2 |
| 6,497,847 | B2 | 12/2002 | Foster et al. |
| 6,532,659 | B1 | 3/2003 | DeSousa et al. |
| 6,591,497 | B2 | 7/2003 | Foster et al. |
| 6,605,259 | B1 | 8/2003 | Henry |
| 6,623,704 | B1 | 9/2003 | Roth |
| 6,624,113 | B2 | 9/2003 | Labarge et al. |
| 6,643,928 | B2 | 11/2003 | Hardesty et al. |
| 6,764,664 | B2 * | 7/2004 | Zhang ............... 423/215.5 |

FOREIGN PATENT DOCUMENTS

| EP | 0984142 | 3/2000 |
|---|---|---|
| EP | 1101908 | 5/2001 |
| EP | 1273773 | 1/2003 |
| WO | 0032911 | 6/2000 |
| WO | 0112320 | 2/2001 |
| WO | 03068364 | 8/2003 |

OTHER PUBLICATIONS

EP search Report Dated Feb. 12, 2004.

* cited by examiner

*Primary Examiner*—Basia Ridley
(74) *Attorney, Agent, or Firm*—Paul A. Marshall (57) ABSTRACT

An exhaust treatment device for treating an exhaust gas stream combines the functionalities of a catalytic particulate filter and a NOx absorber catalyst into a single integral device and is disposed in an exhaust conduit. By combining the functionalities of the catalytic particulate filter and a $NO_x$ absorber catalyst into a single integral device, the exhaust treatment device eliminates the temperature losses inherent to the heat capacity of one catalytic device placed in front of the other.

17 Claims, 5 Drawing Sheets

EXHAUST TREATMENT DEVICE

FIELD OF THE INVENTION

The present disclosure relates to $NO_x$ and particle abatement, particularly with $NO_x$ and particle abatement in exhaust gas streams discharged from automotive engines.

BACKGROUND

In order to meet government mandated exhaust gas emission standards, the exhaust gases of an automotive internal combustion engine must be treated before emission into the atmosphere. Exhaust gas streams are typically passed through a device containing a catalytic element to remove undesirable gaseous emission components such as unburned hydrocarbons, carbon monoxide and nitrogen oxides. The removal of $NO_X$ components is of particular concern, and can be accomplished using a device employing elements containing a $NO_X$ adsorber catalyst. However, $NO_X$ adsorber catalysts are sensitive to sulfur poisoning and must be periodically desulfurized, otherwise their performance gradually decreases.

In addition to the gaseous components, exhaust gas streams also contain particulate matter such as carbon-containing particles or soot. A particulate filter, also commonly used with compression ignition engines, is used to prevent the carbon particles or soot from exiting the tailpipe. The particulate filter is typically a stand-alone device separate and distinct from devices employing catalytic elements for removing undesirable NOx gaseous components. Carbon particles are trapped in the particulate filter and continuously and/or periodically burned so that the filter is regenerated and able to again trap the carbon particles.

A catalytic particulate filter comprises a substrate and a catalyst composition typically formed from an inorganic precursor and a catalytic metal. The catalytic particulate filter catalyzes the removal of pollutants from exhaust gases as well as removes particulate from the exhaust gas stream. The catalyst composition is optimized for periodically regenerating the filter.

If the catalytic element and particulate filter (or catalytic particulate filter) are separate elements, they require a large installation space in the exhaust line, which is usually not available, as well as a high installation cost. Moreover, since the devices are serially mounted in the exhaust line, temperature losses inherent to heat capacity would affect the regeneration or desulfurization capabilities of the subsequent device since the regeneration or desulfurization of the respective device is thermally controlled.

BRIEF DESCRIPTION OF THE DRAWINGS

Referring now to the figures wherein the like elements are numbered alike.

BRIEF SUMMARY

Disclosed herein is an exhaust treatment device comprising a plurality of filter elements and plugs alternately arranged in a serpentine-like structure to form a plurality of inlet channels and outlet channels, wherein the plugs are disposed at alternating ends of the filter elements, and wherein fluid communication from the inlet channels to the outlet channels is through the filter elements; a $NO_x$ adsorber composition disposed on and/or impregnated in surfaces of the filter elements or filter elements and plugs that form the inlet channels or outlet channels or a combination of the inlet and outlet channels; and a soot oxidation catalyst composition formed from an inorganic precursor and a catalytic metal disposed on or impregnated in surfaces of the filter elements or filter elements and plugs that form the inlet channels.

In another embodiment, the exhaust treatment device comprises a first block in fluid communication with a second block; the first block comprising a plurality of filter elements and plugs alternately arranged in a serpentine-like structure to form a plurality of inlet channels and outlet channels, wherein the plugs are disposed at alternating ends of the filter elements, and wherein fluid communication from the inlet channels to the outlet channels is through the filter elements, a $NO_x$ adsorber composition disposed on or impregnated in surfaces of the filter elements or surfaces of the filter elements and plugs that form the inlet or outlet channels or combination thereof, and a soot oxidation catalyst composition formed from an inorganic precursor and a catalytic metal disposed on or impregnated in surfaces of the filter elements or surfaces of the filter elements and plugs that form the inlet channels; and the second block comprising a plurality of filter elements and plugs arranged to form a plurality of open-ended passageways and a plurality of closed-ended passageways, wherein the plurality of open-ended passageways are aligned with the outlet channels of the first block facing the second block, and wherein the NOx adsorber composition is disposed on or impregnated in surfaces of the filter elements or the surfaces of the filter elements and plugs that form the outlet channels and the open-ended passageways.

In another embodiment, the exhaust treatment device comprises a first block in fluid communication with a second block; the first block comprising a plurality of filter elements and plugs arranged to form a plurality of open-ended passageways and a plurality of closed-ended passageways, and a soot oxidation catalyst composition formed from an inorganic precursor and a catalytic metal disposed on or impregnated in surfaces of the filter elements or surfaces of the filter elements and plugs that form the open-ended passageways; and the second block comprising a plurality of filter elements and plugs alternately arranged in a serpentine-like structure to form a plurality of inlet channels and outlet channels, wherein the plugs are disposed at alternating ends of the filter elements, and wherein fluid communication from the inlet channels to the outlet channels is through the filter elements, wherein the inlet channels facing the first block are aligned with the open-ended passageways of the first block, and wherein a soot oxidation catalyst composition formed from the inorganic precursor and the catalytic metal is disposed on or impregnated in surfaces of the filter elements or surfaces of the filter elements and plugs that form the inlet channels facing the first block, and wherein a $NO_x$ adsorber composition is disposed on or impregnated in surfaces of the filter elements or surfaces of the filter elements and plugs that form the outlet channels.

In another embodiment, the exhaust treatment device comprises a first block in fluid communication with a second block, the first block comprising a plurality of filter elements and plugs alternately arranged in a serpentine-like structure to form a plurality of inlet channels and outlet channels, wherein the plugs are disposed at alternating ends of the filter elements, and wherein fluid communication from the inlet channels to the outlet channels is through the filter elements, a soot oxidation catalyst composition formed from an inorganic precursor and a catalytic metal disposed on or impregnated in surfaces that form the inlet channels, and a $NO_x$ adsorber composition disposed on or impregnated in surfaces of the filter elements or the surfaces of the filter elements and plugs that form the inlet or outlet channels or combination thereof; and the second block comprising a plurality of filter elements and plugs arranged to form a plurality of open-ended passageways, wherein the filter elements of the second block comprise a thickness less than a thickness of the filter elements in the first block, and wherein the $NO_x$ adsorber composition is disposed on or impregnated in surfaces of the filter elements or the surfaces of the filter elements and plugs that form the open-ended passageways.

A method of treating an exhaust gas stream comprises mounting an exhaust treatment device in an exhaust conduit, wherein the exhaust treatment device comprising a plurality of filter elements and plugs alternately arranged in a serpentine-like structure to form a plurality of inlet channels and outlet channels, wherein the plugs are disposed at alternating ends of the filter elements, and wherein fluid communication from the inlet channels to the outlet channels is through the filter elements, a $NO_x$ adsorber composition disposed on and/or impregnated in surfaces of the filter elements, or filter elements and plugs, that form the inlet channels or outlet channels or combination thereof, and a soot oxidation catalyst composition formed from an inorganic precursor and a catalytic metal disposed on or impregnated in surfaces of the filter elements or filter elements and plugs that form the inlet channels; flowing the exhaust gas stream into the inlet channels of the exhaust treatment device and contacting the soot oxidation catalyst composition, the NOx adsorber composition, or the combination thereof; filtering the exhaust gas stream by flowing through the filter element; and discharging the exhaust gas stream from the exhaust treatment device, wherein the exhaust gas stream further contacts the NOx adsorber composition.

Further advantages and embodiments will be understood by those skilled in the art in light of the detailed description and figures.

DETAILED DESCRIPTION OF THE PREFERRED EMBODIMENT

Disclosed herein is an exhaust treatment device that combines the functionalities of a catalytic particulate filter and a NOx absorber catalyst into a single integral device for use downstream from an engine, e.g., preferably manifold mounted or close coupled. As will be described in further detail, the exhaust treatment device effectively removes particulate soot and reduces concentration of NOx as well as optionally reducing the concentration of unburned hydrocarbons, carbon monoxide, and other undesirable exhaust gas components, from exhaust gases flowing through the exhaust conduit.

Figure 1:
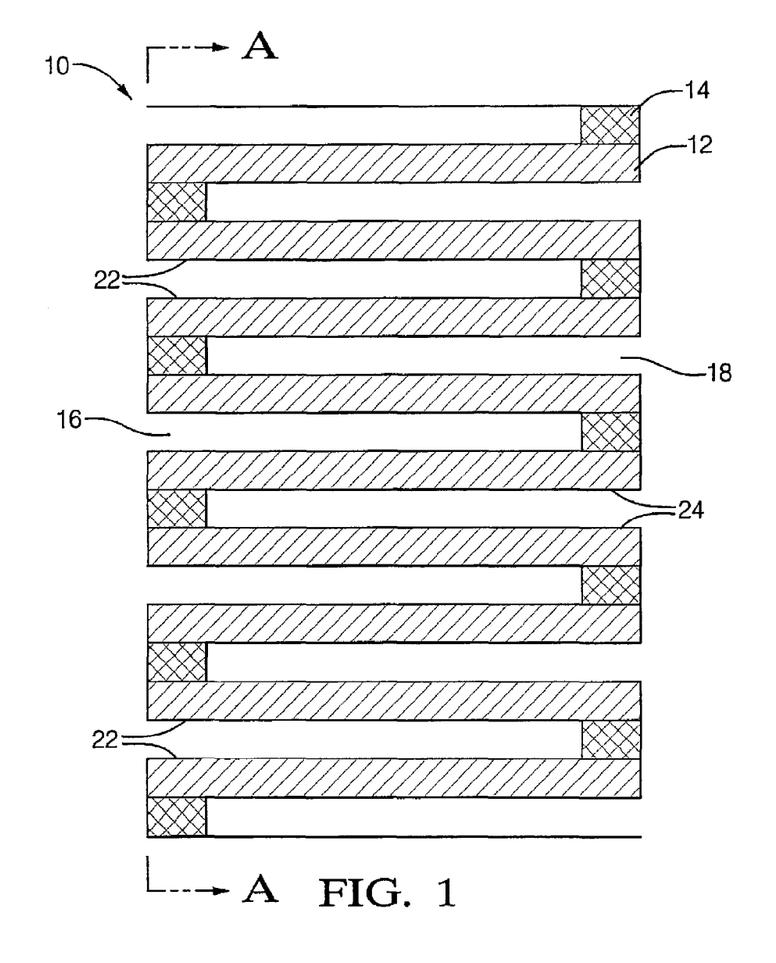
FIG. 1 shows a cross sectional view of an exhaust treatment device.
Figure 2:
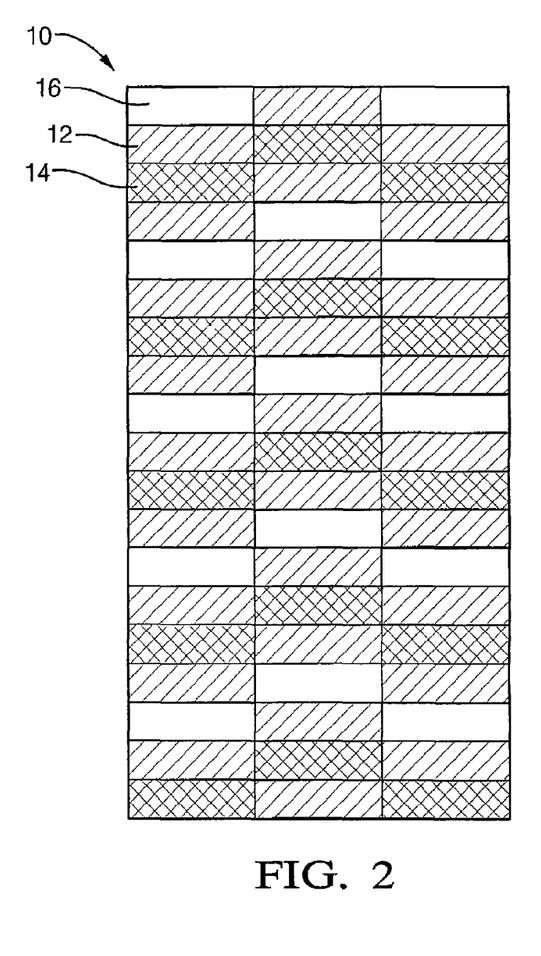
FIG. 2 shows a side view of the exhaust treatment device taken along the lines A—A of FIG. 1.

FIGS. 1 and 2 illustrate one embodiment of an exhaust treatment device 10 that generally comprises a plurality of porous filter elements 12. Plugs 14 are interposed at and between alternating ends of the filter elements 12 to form inlet channels 16 and outlet channels 18, i.e., a serpentine-like cross sectional structure as shown. Preferably, the filter elements 12 are planar and equally spaced apart from adjacent filter elements. Although the serpentine-like structure as shown is preferred, other wall flow shapes can be employed, e.g., a honeycomb geometry, with the combs being any multi-sided or rounded shape, with substantially square, triangular, pentagonal, hexagonal, heptagonal, or octagonal or similar geometries preferred due to ease of manufacturing and increased surface area. In this embodiment, the plugs 14 could be disposed in a regular or random pattern throughout the combs. Suitable assembled filter elements and plugs can be commercially obtained from NGK, Japan, Corning Incorporated, USA, and Ibiden Company Limited, Japan.

In operation, the exhaust gas enters inlet channels 16 and is forced through pores contained within the filter elements 12, and then exits the exhaust treatment device 10 through outlet channels 18. The outermost filter elements may be provided with a mounting flange (not shown) or the like for attachment to an exhaust conduit.

A catalyst material 22 designed for soot combustion, i.e., a soot oxidation catalyst composition, is preferably disposed on surfaces of the filter elements 12 that form the inlet channel 16. Similarly, a catalyst material 24 designed for reducing $NO_x$ emissions, i.e., a $NO_x$ absorber composition, is preferably disposed on surfaces of the filter elements that form the outlet channel 18. Optionally, the NOx absorber composition 24 may also be disposed on the surfaces of the filter elements 12 that form the inlet channel 16 or on a combination of surfaces of the filter elements 12 that form the inlet 16 and outlet channels 18. The thickness or loading of the catalyst materials 22, 24 on any surface of the filter elements 12 is preferably at a thickness effective to prevent an excessive pressure drop e.g., a pressure drop less than or equal to about 30 kPa.

Optionally, the catalyst materials 22 and/or 24 can be applied to a portion of the plug 14 (i.e., plug surfaces that form the inlet channel 16 and/or outlet channel 18) in addition to the surfaces of the filter elements 12. In this manner, passive regeneration of the filter element can occur via soot combustion by $NO_2$, or during the rich excursions aimed at regenerating the $NO_x$ adsorber catalyst.

The exhaust treatment device 10 is preferably disposed in an exhaust conduit in close proximity to the engine to minimize the temperature losses of the exhaust gas to the environment as it flows through exhaust conduit. Periodic regeneration at elevated temperatures of the catalyst materials 22 or 24 disposed on the surfaces of the filter elements 12 may be employed to remove soot buildup and/or for adsorption, release, and/or conversion of $NO_x$ gases. With the above-described integral exhaust treatment device 10, temperature losses inherent to the heat capacity of one catalytic device placed in front of the other is eliminated. As a result, control of the temperature of exhaust gases is easily regulated. For example, an electric heater, light oil burner, or other heating device may be disposed upstream and in thermal communication with the integral exhaust treatment device 10 to produce the temperatures effective for periodic regeneration and/or for adsorption, release, and/or conversion of $NO_x$ gases.

Figure 3:
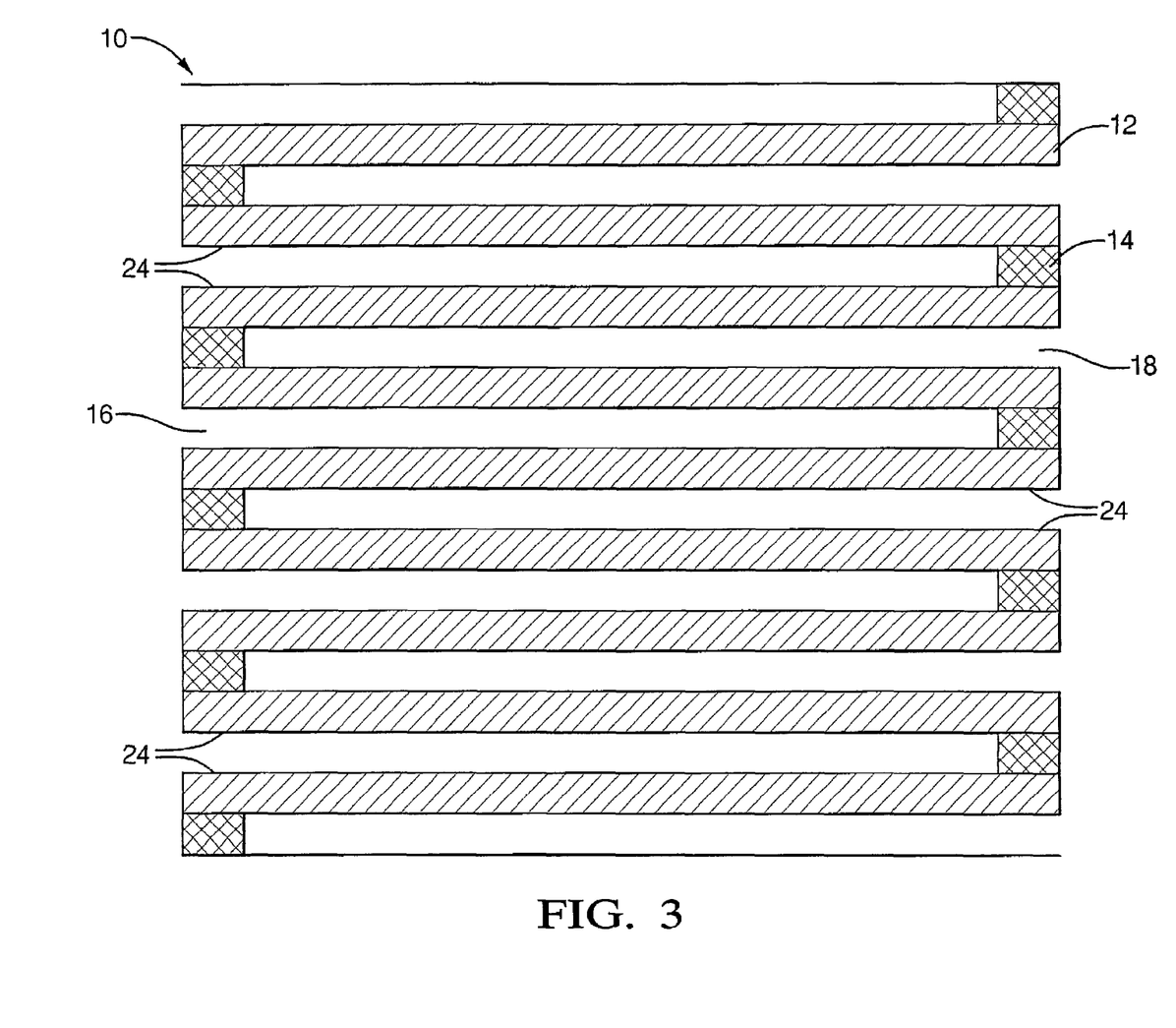
FIG. 3 shows a cross sectional view of an exhaust treatment device in accordance with another embodiment.

FIG. 3 illustrates one embodiment of the exhaust treatment device 10, wherein the NOx absorber composition 24 designed for reducing $NO_x$ emissions is disposed on surfaces of the filter elements 12 and optionally, the surfaces of the plugs 14, adjacent to channels 16 and 18 (soot oxidation catalyst composition 22 is not present). The exhaust treatment device 10 can be utilized in exhaust stream applications where high levels of $NO_x$ emissions reduction are required, for instance under the United States Tier 2 standards to be phased in beginning in the year 2004. In an alternative embodiment, both the NOx absorber composition 24 designed for reducing $NO_x$ emissions and the soot oxidation catalyst composition 22 designed for soot combustion are disposed, in individual layers or as a mixture, on surfaces of the filter elements adjacent to inlet channel 16. Thus, the surfaces of the filter elements 12 that form inlet channel 16 have individual layers of the different catalyst materials or a single layer containing a mixture of the different catalyst materials. In the case of individual layers, the order and number of layers can vary. However, the number and overall thickness of the layers is chosen in order to avoid excessive pressure drop during operation.

Figure 4:
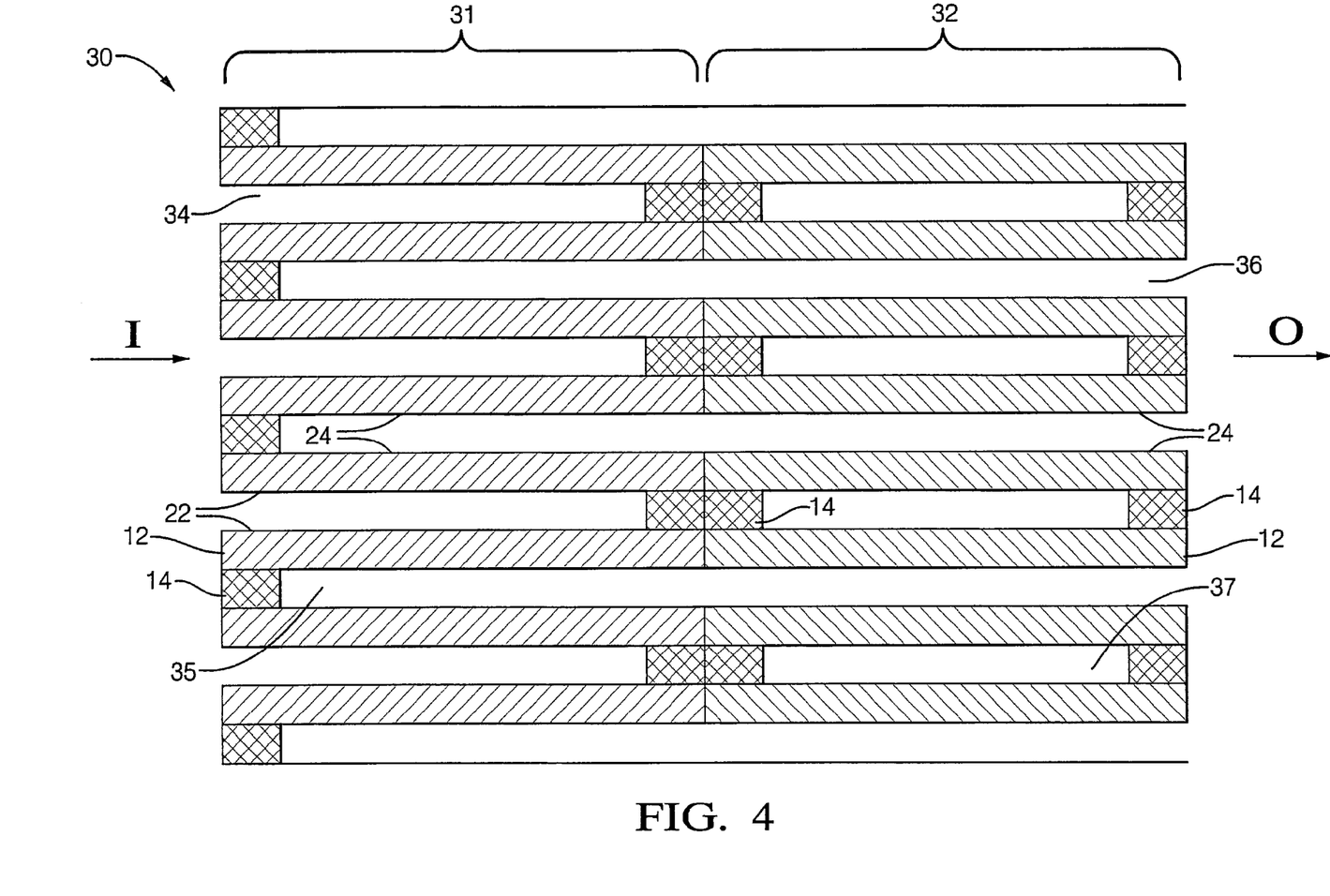
FIG. 4 shows a cross sectional view of an exhaust treatment device in accordance with a third embodiment.

In another embodiment shown in FIG. 4, an exhaust treatment device 30 comprises blocks 31, 32, wherein the outlet facing end of block 31 is joined to the inlet-facing end of block 32. Each block is preferably optimized to provide a different functionality, i.e., catalytic particulate filter (soot oxidation) or $NO_x$ adsorber catalyst. Block 31 preferably comprises filter elements 12 and plugs 14 arranged in the serpentine-like structure to form a plurality of inlet channels 34 and a plurality of outlet channels 35, as shown in FIG. 1. Block 32 preferably comprises arranging the filter elements 12 and plugs 14 such that, within a given cross section, two plugs 14 are sandwiched between two adjacent filter elements 12, i.e., within the same plane. The filter element 12 and plug 14 sandwich alternates throughout block 32 to form a plurality of open-ended passageways 36 and a plurality of closed-ended passageways 37. Block 32 is joined to block 31 such that an inlet channel 34 at inlet "I" run about the length of the first block 31 whereas outlet channels 35 is aligned and in fluid communication with the open-ended passageway 36 to provide a continuous outlet pathway about the length of blocks 31 and 32. The surfaces of the filter element 12 that form the inlet channels 34, and optionally, the surfaces of the plugs 14 that define the inlet channel 34, are preferably coated with the soot oxidation catalyst composition 22 whereas the surfaces of the filter elements 12 that form outlet channels 35 and the open-ended passageway 36, and optionally plugs 14 that define the channel 36, are coated with the $NO_x$ adsorber catalyst material 24. Advantageously, the exhaust treatment device 30 can be used to employ a relatively thick $NO_x$ adsorber catalyst material since the catalytic filtering for the exhaust stream will occur prior to the exhaust stream contacting the $NO_x$ adsorber catalyst material 24, i.e., exhaust stream will pass through catalyst material 22 then $NO_x$ adsorber catalyst material 24. In those applications where high levels of $NO_x$ emissions are anticipated a thickness equal to or greater than about 10 micrometers is preferred, with a thickness equal to or greater than about 25 micrometers even more preferred. Although, thicknesses will vary depending on the design and intended application. The surfaces of the filter element 12 that form inlet channel 34, and optionally surfaces of the plugs 14 that form the channel 34, are preferably coated with the catalyst materials 22 designed for soot combustion at a thickness effective to minimize the pressure drop (e.g., a thickness that gives a back-pressure-drop increase of less than or equal to about 30 kPa).

Figure 5:
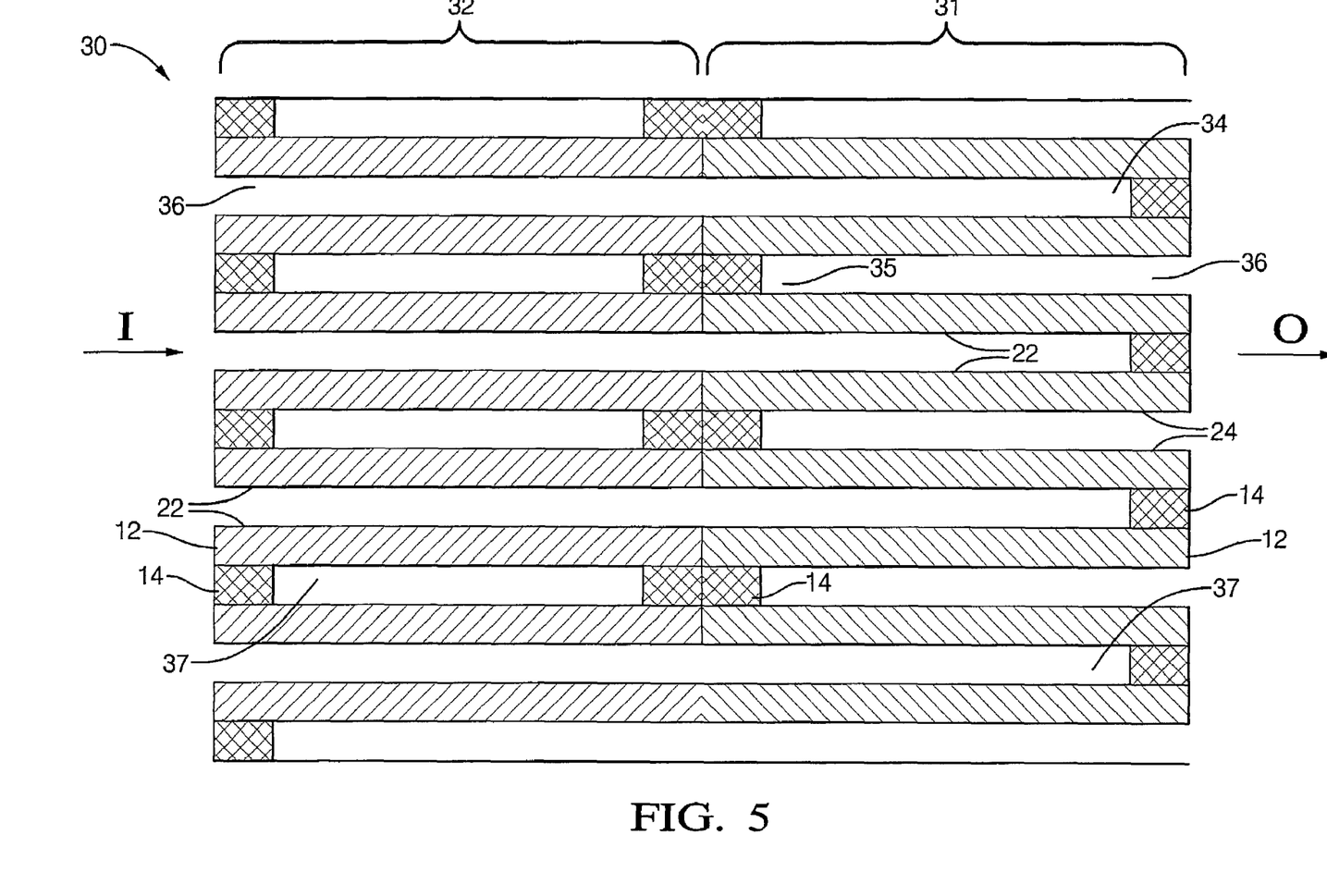
FIG. 5 shows a cross sectional view of an exhaust treatment device in accordance with a fourth embodiment.

In an alternate embodiment shown in FIG. 5, the order of blocks 31, 32 are reversed. In this embodiment, the open-ended passageways 36 formed in the first block (element 32 in this embodiment) are aligned with the inlet channels 34 to provide a continuous inlet pathway. The surface area of the filter elements defining the continuous inlet pathway (open-ended passageway 36 of first block 32 and inlet channel 34 of second block 31) is maximized and as such, can be used to provide greater filtering capacity and/or can require less frequent regeneration.

Figure 6:
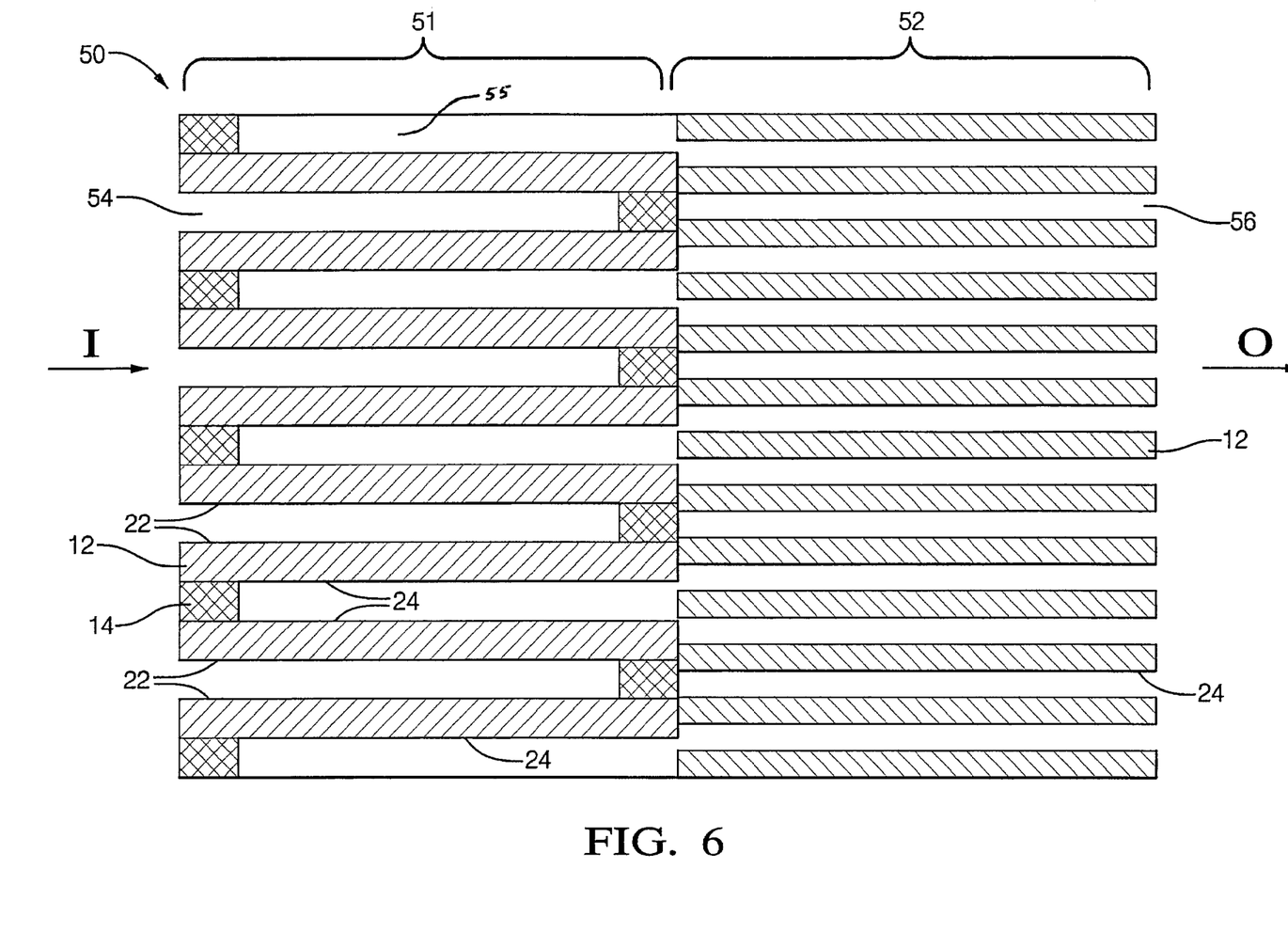
FIG. 6 shows a cross sectional view of an exhaust treatment device in accordance with a fifth embodiment.

FIG. 6 illustrates an exhaust treatment device 50 comprising blocks 51 and 52. In this embodiment, block 51 is optimized for soot combustion and block 52 is optimized for reducing $NO_x$ emissions. It should be apparent that block 51 is configured as a wall flow through device and as such has filtering capabilities. In contrast, block 52 is configured as a continuous flow device. That is, the exhaust entering block 52 does not flow through the filter elements. In this context, reference to the filter elements 12 in connection with the description of block 52 refers to any suitable material for use in the exhaust environment, wherein the surfaces of the material are coated with a NOx adsorber catalyst in the manner previously described, such as for example, the use a washcoat.

Block 51 preferably receives the exhaust stream discharge from an engine through inlet channels 54 at inlet I. The surfaces of the filter elements 12, and optionally the surfaces of the plugs 14, that form inlet channels 54 comprise the soot oxidation catalyst composition 22. Block 52 includes a plurality of open-ended passageways 56, wherein a portion of the open-ended passageways 56 are aligned with the outlet channels 55 to provide a continuous pathway between blocks 51 and 52. As is apparent from the cross sectional view in FIG. 6, some of the open-ended passageways 56 formed in block 52 will not be utilized due to the location of the plugs in block 51. The surfaces of the filter elements 12 that form the open-ended passageways 56 preferably include the NOX adsorber catalyst material 24 designed for $NO_x$ emission reductions. Advantageously, the compact design provides a greater surface area for catalytic $NO_x$ emission reduction to occur.

In block 52, the filter elements 12 in block 52 are designed with a thickness less than the thickness of the filter elements 12 in block 50, thereby providing block 52 with a more compact design and a higher cell density. Preferably, filter elements 12 in block 52 have a thickness that is about 3.5 to about 7.5 mils and block 52 has a filter element thickness of about 12 to about 20 mils. A preferred cell density of block 52 is at about 350 to about 600 cells per square foot whereas the cell density of block 51 is preferably at about 100 to about 350 cells per square inch. Again, as previously described, the filter elements 12 in block 52 do not require filtering capabilities due to the continuous flow design associated with block 52.

The filter elements 12 preferably have a size and a geometry chosen to optimize the surface area in a given particulate filter design. The filter elements 12 can comprise any material designed for use in a spark ignition or diesel engine environment and preferably has the following characteristics: (1) capable of operating at temperatures up to about 1,000° C. or so, depending upon the device's location within the exhaust system; (2) capable of withstanding exposure to hydrocarbons, nitrogen oxides, carbon monoxide, particulate matter (e.g., soot and the like), carbon dioxide, and/or sulfur; and (3) provides sufficient surface area and structural integrity to support a catalyst, e.g., a washcoat, coating, or the like. Some possible suitable materials include cordierite, silicon carbide, mullite, refractory oxides (e.g., alkali zirconium phosphate), metal, metal oxides (e.g., alumina, and the like), glasses, and the like, and mixtures comprising at least one of the foregoing materials. These materials can be in the form of foils, porous materials, sponges, and the like, e.g., metallic foils, open pore alumina sponges, and porous ultra-low expansion glasses.

The $NO_x$ adsorber composition 24 preferably comprises a washcoat comprising a porous support, a catalytic metal component, and one or more $NO_x$ trapping materials (such as alkali metals, alkaline earth metals, and the like, and combinations comprising at least one of the foregoing) disposed thereon. The catalytic metal component and $NO_x$ trapping materials can be impregnated, loaded, imbibed, coated, or otherwise disposed on and/or within the porous support.

The porous support preferably comprises cerium oxide ($CeO_2$), zirconium oxide ($ZrO_2$), lanthanum oxide ($La_2O_3$), yttrium oxide ($Y_2O_3$), and neodymium oxide ($Nd_2O_3$), and the like, as well as combinations comprising at least one of these metal oxides.

The porous support optionally comprises one or more other support materials suitable for use at the high operation temperatures associated with an internal combustion engine (e.g., up to about 1,000° C.). Such materials include, but are not limited to, zeolite, alumina, and the like, as well as combinations comprising at least one of the foregoing, with gamma-alumina, theta-alumina, delta-alumina, and combinations comprising at least one of the foregoing materials being preferred. The porous support may comprise up to about 50 wt % of a cerium-containing mixed oxide, the balance being other support materials; with about 3 wt % to about 25 wt % cerium-containing mixed oxide, the balance being other support materials being more preferred.

The washcoat has a catalytic metal component capable of converting $NO_x$ to nitrogen disposed on and/or in the porous support. The catalytic metal component comprises platinum group metals, such as, platinum (Pt), rhodium (Rh), palladium (Pd), ruthenium (Ru), iridium (Ir), and osmium (Os), as well as alloys and combinations comprising at least one of the foregoing. Preferably, the washcoat is loaded with the catalytic metal component in an amount less than or equal to about 5 weight percent (wt %) of the washcoat based upon the total weight of the washcoat solids, with an amount of about 0.2 wt % to about 3 wt % more preferred, and an amount of about 0.5 wt % to about 2.5 wt % especially preferred.

Where the catalytic metal component is a combination of platinum with one or more other metals, the other metals, e.g., palladium, rhodium and the like, are typically present in an amount less than the platinum. More particularly, with a platinum/palladium combination, the catalytic metal component can comprise up to about 85 wt % platinum and up to about 45 wt % palladium (or other metal); with about 55 wt % to about 80 wt % platinum and about 20 wt % to about 45 wt % palladium preferred based upon the total weight of the catalyst combination. With a platinum/rhodium combination, for example, the catalytic metal component can comprise up to about 95 wt % platinum and up to about 30 wt % rhodium; with about 70 wt % to about 85 wt % platinum and about 2.5 wt % to about 20 wt % rhodium preferred; and about 70 wt % to about 80 wt % platinum and about 5 wt % to about 10 wt % rhodium especially preferred based upon the total weight of the catalyst combination.

In addition to the catalytic metal component, the porous support may be further loaded with one or more $NO_x$ trapping materials, such as alkali metals, alkaline earth metal, and mixtures comprising at least one of the foregoing. Suitable trapping materials include barium (Ba), lithium (Li), potassium (K), magnesium (Mg), sodium (Na), cesium (Cs), strontium (Sr), and combinations comprising at least one of the foregoing, with a mixture of Ba and K being preferred. Generally, the washcoat comprises less than or equal to about 50 wt % trapping material, with an amount of about 1 wt % to about 40 wt % preferred, and an amount of about 5 wt % to about 20 wt % being especially preferred, based upon the total weight of the washcoat. For example, in the case of a trapping material comprising a Ba and K mixture, the Ba is present in an amount up to about 30 wt % of the washcoat, and K is present in an amount up to about 10 wt %. More preferably, the trapping material comprises Ba in an amount of about 7 wt % to about 20 wt % of the washcoat, and K in the amount of about 2 wt % to about 5 wt % of the washcoat.

The washcoat is supported on the filter elements 12, which are suitably stable in the high temperature exhaust gas environment (e.g., up to about 1,000° C.).

Formation of the $NO_x$ adsorber composition onto the filter element 12 comprises application of the washcoat as a mixture or the application of the washcoat components in sequential steps. For example, the porous support, catalytic metal component, and/or trapping materials can be combined to form a slurry. The slurry can then be applied to the filter elements 12. Preferably, however, the washcoat is first applied to the filter elements 12 followed by drying and calcination. The catalytic metal component and trapping materials can then be deposited on or within the washcoat by any suitable manner, such as by impregnation techniques. For example, the catalytic metal component and trapping materials, individually or together, can be dissolved as soluble precursors (e.g., as a salt like potassium nitrate) in an aqueous or organic solvent, which is then impregnated into the porous support. Preferably, the catalytic metal components are impregnated prior to the trapping materials.

Alternatively, the trapping material and catalytic metal component precursors can also be dissolved together in a common solution and impregnated into the washcoat in a single step. For example, loading of the catalytic metal component onto the washcoat may be accomplished with a catalytic metal precursor solution. Suitable precursor solutions are aqueous solutions, which facilitate efficient chemisorption of the catalytic metal onto the washcoat. Suitable precursor solutions include platinum nitrate solution, platinum chloride solution, and similar materials and combinations thereof, with platinum nitrate solution being preferred.

The catalytic metal precursor solution can be applied to the cerium-containing mixed oxide prior to mixing with other washcoat components. For example, in an embodiment wherein the washcoat comprises alumina and a cerium-containing mixed oxide, alumina is added after the precursor solution is applied to the mixed oxide. This preparation method facilitates the selective deposition of catalytic metal onto the cerium-containing mixed oxide surface, rather than onto other components of the porous support (e.g., the other support materials, such as $BaCO_3$ and $Al_2O_3$). Selective deposition of platinum can enhance the $NO_x$ adsorber catalyst resistance to sulfur poisoning.

The soot oxidation catalyst composition 22 preferably comprises a catalyst composition formed from an inorganic precursor and a catalytic metal. The catalyst is a catalytically active metal that reacts with and converts pollutants (e.g., HC, CO and/or $NO_x$ and the like) to water, $CO_2$, $N_2$ and the like. The catalyst materials 22 reduce the concentration of at least one component of the exhaust gas.

A preferred soot oxidation catalyst composition is one that can be disposed on the surfaces of the filter elements 12 such that a minimal pressure drop increase is observed as exhaust passes through the filter element 12. The pressure drop when the exhaust passes through the filter element 12 increases with the amount of particulates collected in the trap. If the pressure drop is too high, the engine performance may be hampered due to increased backpressure. Thus, the filter element 12 should keep the pressure drop at a minimal level at the beginning of use as well as after a large amount of particulates have been collected in the trap. A preferred pressure drop is equal to or below about 30 kPa (kilopascals).

The inorganic precursor can comprise an alkali metal aluminate precursor. The alkali metal aluminate precursor is preferably formed by the protocol of, for example, U.S. Pat. No. 5,614,596. An alkali metal aluminate precursor can be formed by the reaction of an alkali hydroxide, aluminum hydroxide and a complexing agent. Preferred complexing agents are triethanolamine (TEA) and trisopropanolamine (TIPA). A preferred alkali metal aluminate precursor is formed by reacting (e.g. distilling) lithium hydroxide, aluminum hydroxide, and TEA. Another preferred alkali metal aluminate precursor is formed by reacting (e.g., distilling) potassium hydroxide, aluminum hydroxide, and TEA. Yet another preferred alkali metal aluminate precursor is formed by reacting (e.g., distilling) cesium hydroxide, aluminum hydroxide, and TEA. The alkali metal aluminate precursor is preferably a polymer containing metal-triethanolamine complexes. The resulting solution is referred to as an alkali metal aluminate precursor because calcination of this solution (e.g., at temperatures of 500 to 800° C.), will result in the production of the corresponding alkali metal aluminate. Some possible alkali metal aluminates include lithium aluminate, potassium aluminate and cesium aluminate. Formation of an alkali metal aluminate can be confirmed by X-ray diffraction.

The catalyst is a catalytically active metal that reacts with and converts pollutants (e.g., HC, CO and/or $NO_x$ and the like) to water, $CO_2$, $N_2$ and the like. Typical catalytically active metals include platinum (Pt), palladium, rhodium, iridium, osmium, ruthenium, tantalum, zirconium, yttrium, cerium, nickel, copper, and the like, as well as combinations comprising at least one of the foregoing metals, and other catalysts, with platinum preferred.

The catalytic metal is preferably incorporated into the inorganic precursor to provide an atomically isolated, and substantially uniformly dispersed catalyst. A preferred method of dispersing the catalytic metal in the inorganic precursor is to calcine an alkali metal aluminate precursor and a catalytic metal salt to produce a mixture of alkali metal aluminate and alkali metal catalytic metal oxide. Preferred catalytic metal salts are platinum nitrate, platinum sulfite, and platinum hydroxides such as $Pt(OH)_6$ (ethanolamine)$_2$ (platinum ethanolamine hydroxide) and $Pt(NH_3)_4(OH)_2$ (platinum amino hydroxide). Platinum nitrate and platinum hydroxides are particularly preferred.

A preferred method to form the mixture of alkali metal aluminate and alkali metal catalytic metal oxide is to calcine an alkali metal aluminate precursor in the presence of a catalytic metal salt. A preferred method is to heat the mixture to a temperature sufficient to remove non-reacted triethanolamine (TEA). Once the TEA is removed, the temperature is increased to a sufficient temperature to decompose metal triethanolamine complexes. Finally the temperature is increased to a third temperature sufficient to form the mixture of alkali metal aluminate and alkali metal catalytic metal oxide. For example, a mixture of lithium aluminate precursor and platinum nitrate can be heated up to about 150° C. to remove any non-reacted TEA, then heated up to about 400° C. to decompose metal triethanolamine complexes, and then heated up to about 450 to 650° C. to form the mixture of alkali metal aluminate and alkali metal catalytic metal oxide. Heating to about 450 to 650° C. is sufficient to form a mixture of alkali metal aluminate and alkali metal catalytic metal oxide as well as some unreacted catalytic metal.

Optionally, the mixture of alkali metal aluminate, alkali metal catalytic metal oxide and catalytic metal can be calcined again for a sufficient time and at a sufficient temperature to convert any remaining catalytic metal to the alkali metal catalytic metal oxide, (e.g., at up to about 750 to 900° C. for up to about 16 hours). The mixture of alkali metal aluminate and alkali metal catalytic metal oxide, which is now substantially free of unreacted catalytic metal, can also be used for catalytic diesel particulate filter applications. A mixture of alkali metal aluminate and alkali metal catalytic metal oxide, which is substantially free of unreacted catalytic metal, preferably comprises less than or equal to about 5% unreacted catalytic metal, more preferably less than or equal to about 2% unreacted catalytic metal.

The method described in this disclosure provides a substantially uniform dispersion of the alkali metal catalytic metal oxide in the alkali metal aluminate. A substantially uniform dispersion of catalytic metal oxide exhibits a crystalline domain size calculated using Scherer Equation from full-width-at-maximum-intensity of the (003) X-ray diffraction peak of less than about 500 Å (Angstroms). The mixture of alkali metal aluminate and alkali metal catalytic metal oxide can also be formed by, for example, reacting an alkali metal carbonate and a metallic platinum compound (JCPDS card No. 29-0820). Forming the inorganic precursor and the catalyst in the same reaction as described in the present disclosure, however, has the advantage of producing a substantially uniform dispersion of the catalyst. Substantially uniform dispersion of the catalytic metal can provide a more effective catalyst. An additional feature of the catalyst disclosed herein is that the catalytic metal in the alkali metal catalytic metal oxide maintains its catalytic activity in the complex.

In addition to the above-described methods, the alkali metal catalytic metal oxide can also be made by impregnation of a catalytic metal salt such at Pt nitrate onto an alkali metal aluminate powder. The resulting powder can be calcined for a sufficient time and at a sufficient temperature to produce the alkali metal catalytic metal oxide, for example, calcining at 500 to 800° C. for 16 hours in air.

Disposed on and/or throughout the filter elements 12 is the soot oxidation catalyst material 22 (e.g., the alkali metal aluminate and the alkali metal catalytic metal oxide). The catalyst material 22 can be coated, imbibed, impregnated, physisorbed, chemisorbed, precipitated, or otherwise applied to the filter elements 12. Application of the catalyst material 22 to the filter element 12 can be accomplished by such techniques as spraying, dipping, or painting, for example. A preferred quantity of the alkali metal aluminate/alkali metal catalytic metal oxide composition is that sufficient to catalyze a reduction in concentration of at least one exhaust gas component. A preferred catalyst composition loading density is about 0.01 to about 0.5 g/in$^3$ (grams/cubic inch) (about 0.00061 to about 0.031 g/cm$^3$ (grams per cubic centimeter)), with about 0.1 to about 0.2 g/in$^3$ (about 0.0061 to about 0.12 g/cm$^3$) more preferred. A preferred catalytic metal loading is about 0.0011 to about 0.058 g/in$^3$ (about 0.000067 to about 0.0035 g/cm$^3$) with 0.0058 to 0.041 g/in$^3$ (about 0.00035 to about 0.0025 g/cm$^3$) more preferred. In addition, it is preferred that the alkali metal aluminate/alkali metal catalytic metal oxide composition be deposited onto the filter elements 12 in an amount that gives a backpressure-drop increase of less than or equal to about 30 kPa.

A method of using the exhaust treatment device 10, 30 or 50, comprises mounting the exhaust treatment device 10, 30 or 50 in an exhaust conduit, such that an exhaust gas discharged from an engine flows through the exhaust treatment device 10, 30, or 50 prior to being discharged to the external environment. The exhaust treatment device removes soot, particulate matter, and removes NOx from an exhaust gas stream. Under lean operating conditions, NOx is adsorbed by the NOx adsorber catalyst composition whereas under rich operating conditions NOx is released and converted to nitrogen.

Advantageously, the exhaust treatment devices in accordance with the present disclosure provide simultaneous reduction of particulate matter and undesirable gases from an exhaust gas flowing through the exhaust treatment device. Moreover, regeneration (soot oxidation catalyst composition 22) and desulfurization ($NO_x$ adsorber composition 24) of the exhaust treatment devices 10, 30, 50 can occur since temperature losses inherent to the heat capacity of one catalytic device placed in front of the other are eliminated.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. An exhaust treatment device comprising:
    a plurality of filter elements and plugs alternately arranged in a serpentine structure to form a plurality of inlet channels and outlet channels, wherein the plugs are disposed at alternating ends of the filter elements, and wherein fluid communication from the inlet channels to the outlet channels is through the filter elements;
    a $NO_x$ adsorber composition disposed on and/or impregnated in surfaces of the filter elements or filter elements and plugs that form the inlet channels or outlet channels or a combination of the inlet and outlet channels; and
    a soot oxidation catalyst composition formed from an inorganic precursor and a catalytic metal disposed on or impregnated in surfaces of the filter elements or filter elements and plugs that form the inlet channels
    wherein the catalyst composition comprises an alkali metal catalytic metal oxide substantially uniformly dispersed in an alkali metal aluminate;
    wherein the alkali metal aluminate is selected from the group consisting of lithium aluminate, potassium aluminate, cesium aluminate, and mixtures comprising one or more of the foregoing aluminates; and
    wherein the alkali metal catalytic metal oxide comprises platinum, palladium, rhodium, ruthenium, iridium, osmium, and alloys and mixtures comprising at least one of the foregoing.

2. The exhaust treatment device according to claim 1, wherein the NOx adsorber composition and the soot oxidation catalyst composition form a mixture and are disposed on or impregnated in surfaces of the filter elements or the surfaces of the filter elements and plugs that form the outlet channels and\or inlet channels.

3. The exhaust treatment device according to claim 1, wherein the NOx adsorber composition and the soot oxidation catalyst composition form alternating layers on the surfaces of the filter elements or the surfaces of the filter elements and plugs that form the outlet channels and/or inlet channels.

4. The exhaust treatment device according to claim 1, wherein the NOx adsorber composition and the soot oxidation catalytic composition comprise a thickness effective to minimize a pressure drop across the filter elements to less than or equal to about 30 kPA.

5. The exhaust treatment device according to claim 1, wherein the $NO_x$ adsorber composition comprises a washcoat, the washcoat comprising a support material, a cerium-containing mixed oxide, a catalytic metal component, and a trapping material.

6. The exhaust treatment device according to claim 5, wherein the cerium-containing mixed oxide further comprises an oxide selected from the group consisting of zirconium oxide, lanthanum oxide, yttrium oxide, neodymium oxide, and combinations comprising at least one of the foregoing oxides.

7. The exhaust treatment device according to claim 5, wherein the catalytic metal component is present in an amount of up to about 5 wt %, based upon the total weight of the washcoat.

8. The exhaust treatment device according to claim 5, wherein the catalytic metal component is present in an amount of 0.2 wt % to about 3 wt %, based upon the total weight of the washcoat.

9. The exhaust treatment device according to claim 5, wherein the trapping material is selected from the group consisting of alkali metals, alkaline earth metals, and mixtures comprising at least one of the foregoing.

10. The exhaust treatment device according to claim 5, wherein the trapping material is selected from the group consisting of barium, lithium, sodium, cesium, potassium, magnesium, strontium, and mixtures comprising at least one of the foregoing.

11. The exhaust treatment device according to claim 5, wherein the trapping material is present in an amount of up to about 50 wt %, based upon the total weight of the washcoat.

12. The exhaust treatment device according to claim 5, wherein the trapping material is present in an amount of up to about 40 wt %, based upon the total weight of the washcoat.

13. The exhaust treatment device according to claim 5, wherein the trapping material is present in an amount of about 5 wt % to about 20 wt %, based upon the total weight of the washcoat.

14. The exhaust treatment device according to claim 5, wherein the trapping material further comprises about 7 wt % to about 20 wt % barium and about 2 wt % to about 5 wt % potassium, based upon the total weight of the washcoat.

15. The exhaust treatment device according to claim 5, wherein the cerium-containing mixed oxide is present in an amount of up to about 50 wt %, based upon the total weight of the washcoat.

16. The exhaust treatment device according to claim 5, wherein the cerium-containing mixed oxide is present in an amount of about 3 wt % to about 25 wt %, based upon the total weight of the washcoat.

17. The exhaust treatment device according to claim 1 wherein the alkali metal catalytic metal oxide comprises lithium platinum oxide.

* * * * *